M. CRAIGHEAD.
FASTENING MEANS AND METHOD OF APPLYING SAME.
APPLICATION FILED MAR. 24, 1920.
1,423,833.
Patented July 25, 1922.
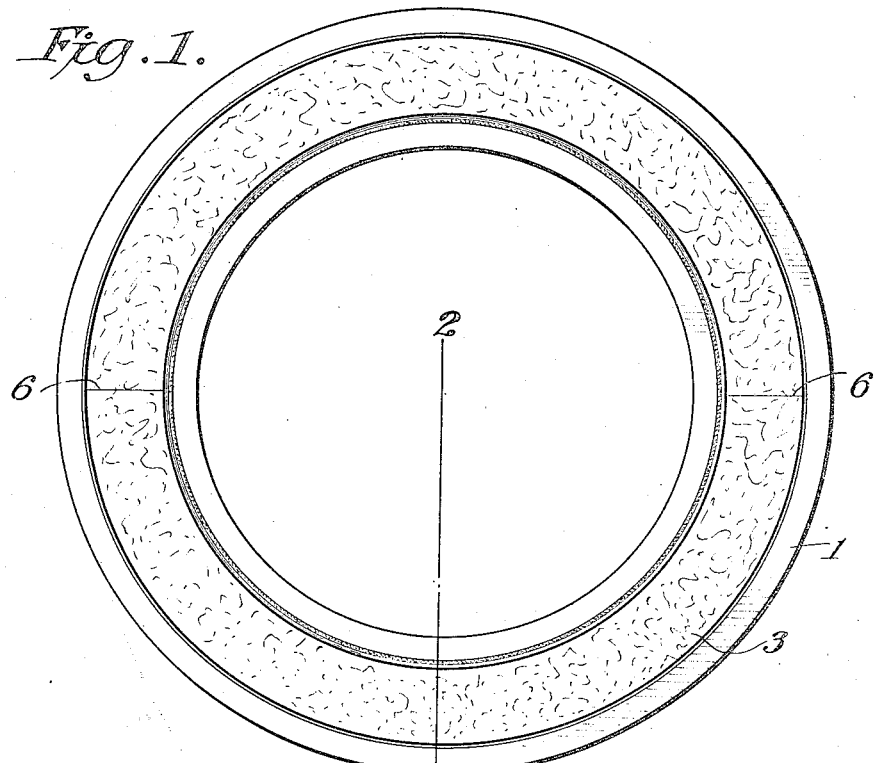
Fig. 1.
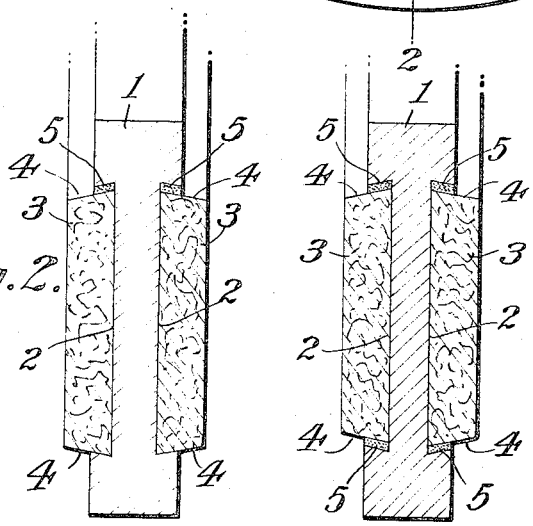
Fig. 2.
Fig. 3.
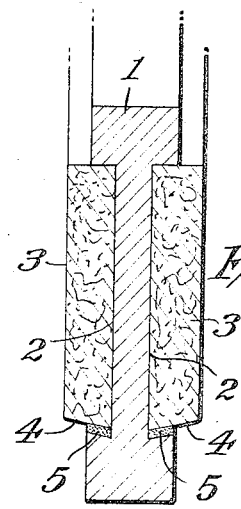
Fig. 4.
Inventor
By Attorney

UNITED STATES PATENT OFFICE.

MAGRUDER CRAIGHEAD, OF HARTSDALE, NEW YORK, ASSIGNOR TO JOHNS-MANVILLE INCORPORATED, A CORPORATION OF NEW YORK.

FASTENING MEANS AND METHOD OF APPLYING SAME.

1,423,833.     Specification of Letters Patent.     Patented July 25, 1922.

Application filed March 24, 1920. Serial No. 368,255.

*To all whom it may concern:*

Be it known that I, MAGRUDER CRAIGHEAD, a citizen of the United States of America, residing at Hartsdale, county of Westchester, State of New York, have invented certain new and useful Improvements in Fastening Means and Methods of Applying Same, of which the following is a specification.

My invention relates to means for fastening two bodies together by practically a dove-tailed joint in situations where ordinarily such dove-tailed joint cannot be used because the members cannot be slid with relation one to the other, as may be necessary to produce the engagement of the dove-tailed parts. This is particularly applicable to the fastening of ring-shaped facings in discs or rings as is necessary in the construction of disc type friction clutches such as are commonly used on motor cars, and for the transmission of power.

The best form of apparatus embodying my invention at present known to me is illustrated in the accompanying sheet of drawings in which—

Fig. 1 is a face view of a ring or disc for use in a friction clutch;

Fig. 2 is an enlarged cross section on line 2—2, of Fig. 1, parts being broken away;

Figs. 3 and 4 are similar sectional views showing modifications.

Throughout the drawings, like reference characters indicate like parts. 1, is the plate or disc or base, usually made of metal, having an undercut groove 2, formed in one or both faces. 3, 3, represent friction facing rings for insertion in these circular grooves 2, 2. These grooves have one or more undercut walls, 4, 4, which correspond to the slope of the adjacent walls of the rings, 3, 3; and 5, 5, represent keys, preferably composed of cement, inserted between the edges of the rings and the adjacent walls of the groove.

In Fig. 2, both walls of the grooves are undercut and the facing rings 3, 3, have cross sections to correspond, but the rings are inserted in sections, being cut at 6, 6, as indicated in Fig. 1. This makes it possible to use a key 5, at one edge only, as the half rings can be slid radially under the opposite overhanging wall of the groove.

In Fig. 3, a key is used at each edge of the ring and this permits the rings 3, to be dropped into the grooves even if such rings are made integral and continuous.

In Fig. 4, only one edge of the groove is undercut, the other being perpendicular to the bottom of the groove. A key is used only at that side of the groove, which is undercut.

It is to be understood that the keys 5, may be made of some solid material of proper thickness and cemented or otherwise fastened after being slid into place, but the preferable method is to form the key in situ by packing cement into the space left in the groove, which cement afterwards sets, hardens and so forms the solid key required.

So long as one wall of the groove is undercut, the other wall may be either undercut or perpendicular to the face of the base member, or of other shape, so long as it is not sloping at an angle to the plane of the base member as large as or larger than the angle of inclination of the opposite undercut wall and the cross section of the ring conforms so that the narrowest part of the groove is of less width than the greatest width of the assembled ring section and key.

Having described my invention, I claim:

1. The combination of a base member having a ring-shaped groove with one wall under-cut, a second member conforming in curvature to the groove, and of a cross section similar to that of the groove but of slightly less width and a key adapted to fill the space between one wall of the base member and the opposing wall of the second member when the second member rests on the bottom of said groove.

2. The combination of a base member having a ring-shaped groove in its surface, both walls of which groove are under-cut, a second member conforming in curvature to the groove and having a cross section similar to that of the groove but of sufficiently less width to permit it to be inserted in the groove, and a key adapted to fill the space existing between one wall of the groove and the opposing surface of the second member when said second member rests on the bottom of the groove.

MAGRUDER CRAIGHEAD.

Witness:
B. C. McCLURE.